(12) United States Patent
Wang et al.

(10) Patent No.: US 9,246,570 B2
(45) Date of Patent: *Jan. 26, 2016

(54) METHOD AND DEVICE FOR PHASE ADJUSTMENT BASED ON CLOSED-LOOP DIVERSITY FEEDBACK

(71) Applicant: GOOGLE INC., Mountain View, CA (US)

(72) Inventors: Sherwin J. Wang, Towaco, NJ (US); Eduardo Abreu, Allentown, PA (US); Haim Harel, New York, NY (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/464,433

(22) Filed: Aug. 20, 2014

(65) Prior Publication Data

US 2014/0355719 A1  Dec. 4, 2014

Related U.S. Application Data

(63) Continuation of application No. 13/398,598, filed on Feb. 16, 2012, now Pat. No. 8,849,222.

(60) Provisional application No. 61/443,542, filed on Feb. 16, 2011.

(51) Int. Cl.
*H03C 7/02* (2006.01)
*H04B 7/06* (2006.01)

(52) U.S. Cl.
CPC ............ *H04B 7/0673* (2013.01); *H04B 7/0671* (2013.01); *H04B 7/0682* (2013.01)

(58) Field of Classification Search
CPC .. H04B 7/0634; H04B 7/0654; H04B 7/0619; H04B 7/0632; H04B 7/0617; H04B 7/0636; H04B 7/0669; H04B 7/0671; H04B 7/0615; H04B 7/0842; H04B 7/0877; H04L 25/03159; H04L 2025/03426; H04L 1/0055; H04L 1/06; H04L 25/0206; H04L 25/022; H04L 25/03006; H04W 52/146; H04W 52/325; H04W 52/48; H04W 52/50; H04W 74/0866; H04W 52/367; H04W 52/54
USPC ................. 370/203, 252, 318, 238, 334, 329, 370/335–337, 342, 464; 375/147, 136, 148, 375/267, 150, 219, 260, 259, 295, 299, 316, 375/340, 346, 347, 349, 354, 355; 455/101, 455/12.1, 137, 24, 272, 403, 422.1, 423, 455/442, 452.1, 502, 509, 522

See application file for complete search history.

(56) References Cited

U.S. PATENT DOCUMENTS 5,642,353 A  6/1997  Roy, III et al.
5,832,044 A  11/1998  Sousa et al.

(Continued)

FOREIGN PATENT DOCUMENTS

EP  0 986 193  3/2000
EP  1 282 242  2/2003

(Continued)

OTHER PUBLICATIONS

Derryberry et al., "Transmit Diversity in 3G CDMA Systems", Wideband Wireless Access Technologies to Broadband Internet, IEEE Communicatins Magazine, Apr. 2002, pp. 68-75.

(Continued)

*Primary Examiner* — Golam Sorowar
(74) *Attorney, Agent, or Firm* — Troutman Sanders LLP; James E. Schutz; Andrew C. Doherty

(57) ABSTRACT

A mobile communications method, device, and system for adjusting a phase parameter in a diversity signal, based at least in part on phase feedback from a base station. While in uplink communication with a base station, a mobile device may receive a phase feedback signal from the base station. The mobile device may calculate a modified value of a phase parameter based on the phase feedback signal in order to transmit diversity signals with a gradual change in phase difference. The modified value may be between a phase parameter value indicated by the base station's phase feedback signal and a phase parameter value initially transmitted by the mobile device.

11 Claims, 4 Drawing Sheets

(56) References Cited

U.S. PATENT DOCUMENTS

| | | | |
|---|---|---|---|
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,492,942 B1 | 12/2002 | Kezys | |
| 6,636,495 B1 | 10/2003 | Tangemann | |
| 6,704,370 B1 | 3/2004 | Chheda et al. | |
| 6,745,009 B2 | 6/2004 | Raghothaman | |
| 6,754,473 B1 | 6/2004 | Choi et al. | |
| 6,810,264 B1 | 10/2004 | Park et al. | |
| 6,859,643 B1 | 2/2005 | Ma et al. | |
| 6,882,228 B2 | 4/2005 | Rofougaran | |
| 7,035,343 B2 * | 4/2006 | Chi et al. | 375/265 |
| 7,414,962 B2 * | 8/2008 | Izumi | 370/206 |
| 7,660,598 B2 | 2/2010 | Barnett et al. | |
| 7,729,714 B2 | 6/2010 | Black et al. | |
| 2003/0112880 A1 | 6/2003 | Walton et al. | |
| 2004/0048584 A1 | 3/2004 | Vaidyanathan et al. | |
| 2004/0085239 A1 | 5/2004 | Ukena et al. | |
| 2005/0059355 A1 | 3/2005 | Liu | |
| 2005/0143113 A1 | 6/2005 | Lee et al. | |
| 2008/0227405 A1 * | 9/2008 | Harel et al. | 455/69 |
| 2011/0085537 A1 * | 4/2011 | Tsai et al. | 370/342 |
| 2011/0176593 A1 | 7/2011 | Hultell et al. | |

FOREIGN PATENT DOCUMENTS

| | | |
|---|---|---|
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | 97/24818 | 7/1997 |
| WO | 00/79701 | 12/2000 |
| WO | 01/69814 | 9/2001 |
| WO | 03/090386 | 10/2003 |
| WO | 2004/045108 | 5/2004 |
| WO | 2005/081444 | 9/2005 |

OTHER PUBLICATIONS

Rashid-Farrokhi et al., "Transmit Beamforming and Power Control for Cellular Wireless Systems", IEEE Journal on Selected Areas in Communications, vol. 16, No. 8, Oct. 1998, pp. 1437-1450.

* cited by examiner

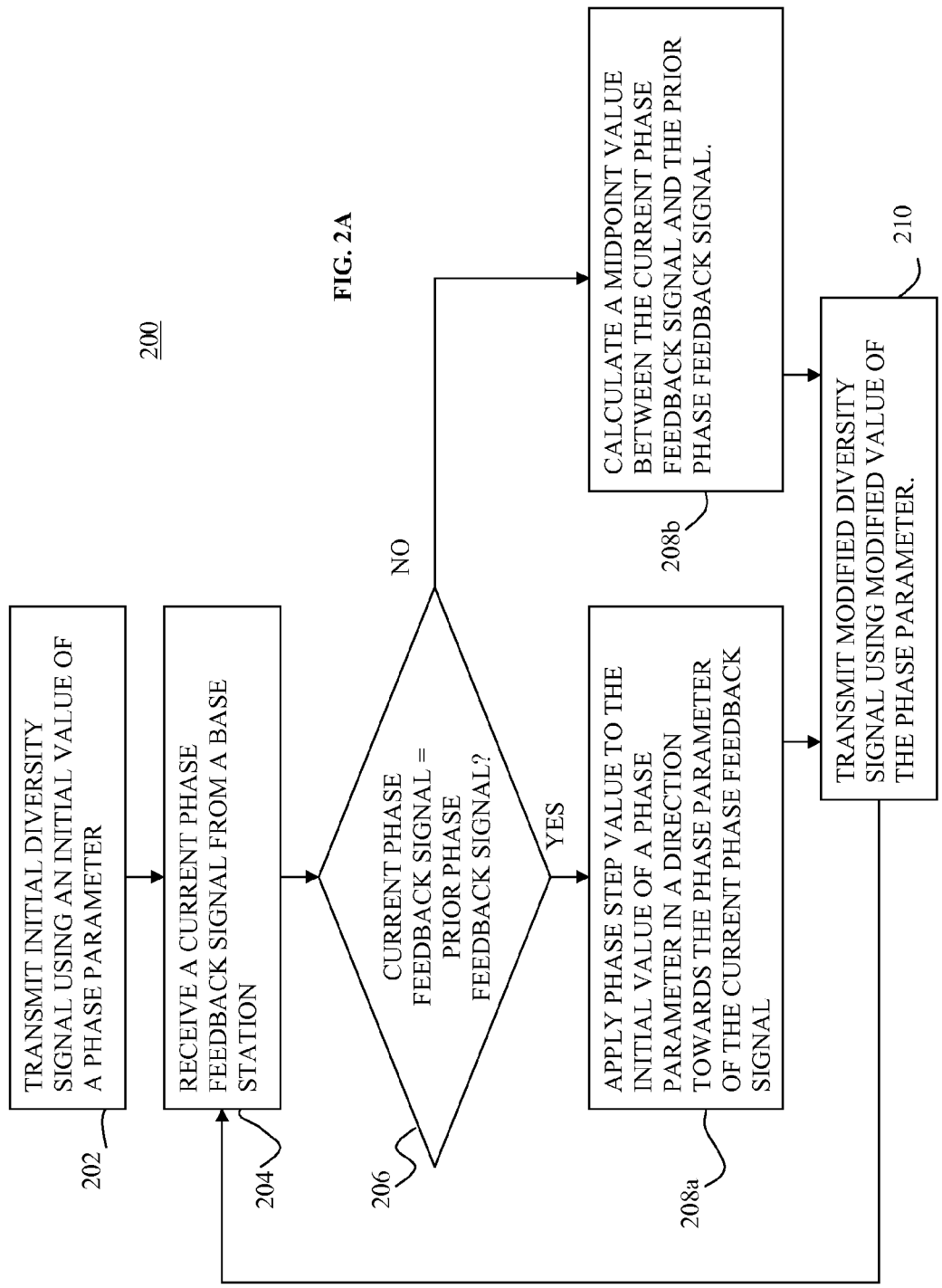

METHOD AND DEVICE FOR PHASE ADJUSTMENT BASED ON CLOSED-LOOP DIVERSITY FEEDBACK

CROSS-REFERENCE TO RELATED APPLICATIONS

This application is a continuation of U.S. application Ser. No. 13/398,598 filed Feb. 16, 2012, now allowed, which claims benefit of U.S. Provisional Patent Application Ser. No. 61/443,542 filed Feb. 16, 2011, the entirety of which are incorporated by reference herein.

FIELD OF THE INVENTION

This invention relates generally to the field of mobile wireless communications and more specifically to adjusting phase parameters based closed-loop diversity feedback.

BACKGROUND OF THE INVENTION

In a mobile transmit diversity system, a base station may send diversity feedback to a mobile communications device or mobile device in its network or vicinity. The diversity feedback may instruct the mobile device to transmit a diversity signal with certain diversity parameters, such as phase difference or relative power amplitude. A base station may limit the size of its feedback to a mobile device to save downlink bandwidth. For example, a codebook size limitation considered by the 3$^{rd}$ Generation Partnership Project (3GPP) is two bits. Such phase feedback may only have four codebook options to direct the mobile device's phase: 0, +90, 180, or −90, for example. However, it is difficult with such a coarse resolution to provide sufficient sensitivity for optimum diversity gain.

SUMMARY OF EMBODIMENTS OF THE INVENTION

Embodiments of the invention include a method, device, and system for adjusting a phase difference between two signals, based on closed-loop transmit diversity feedback from a base station. A mobile communications device may receive transmit diversity feedback from a base station, and the phase feedback signal may be based on a previous diversity signal received at the base station. The mobile device may calculate a modified value of a phase parameter based on the phase feedback signal. The modified value may be between a phase parameter value indicated by the phase feedback signal and a phase parameter value previously transmitted by the mobile device. The mobile device may control and determine different methods of calculation based on prior phase feedback signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2A is a flowchart diagram of a method of adjusting phase difference based on comparing a current phase feedback with a prior phase feedback signal, according to an embodiment of the present invention;

Figure 1:
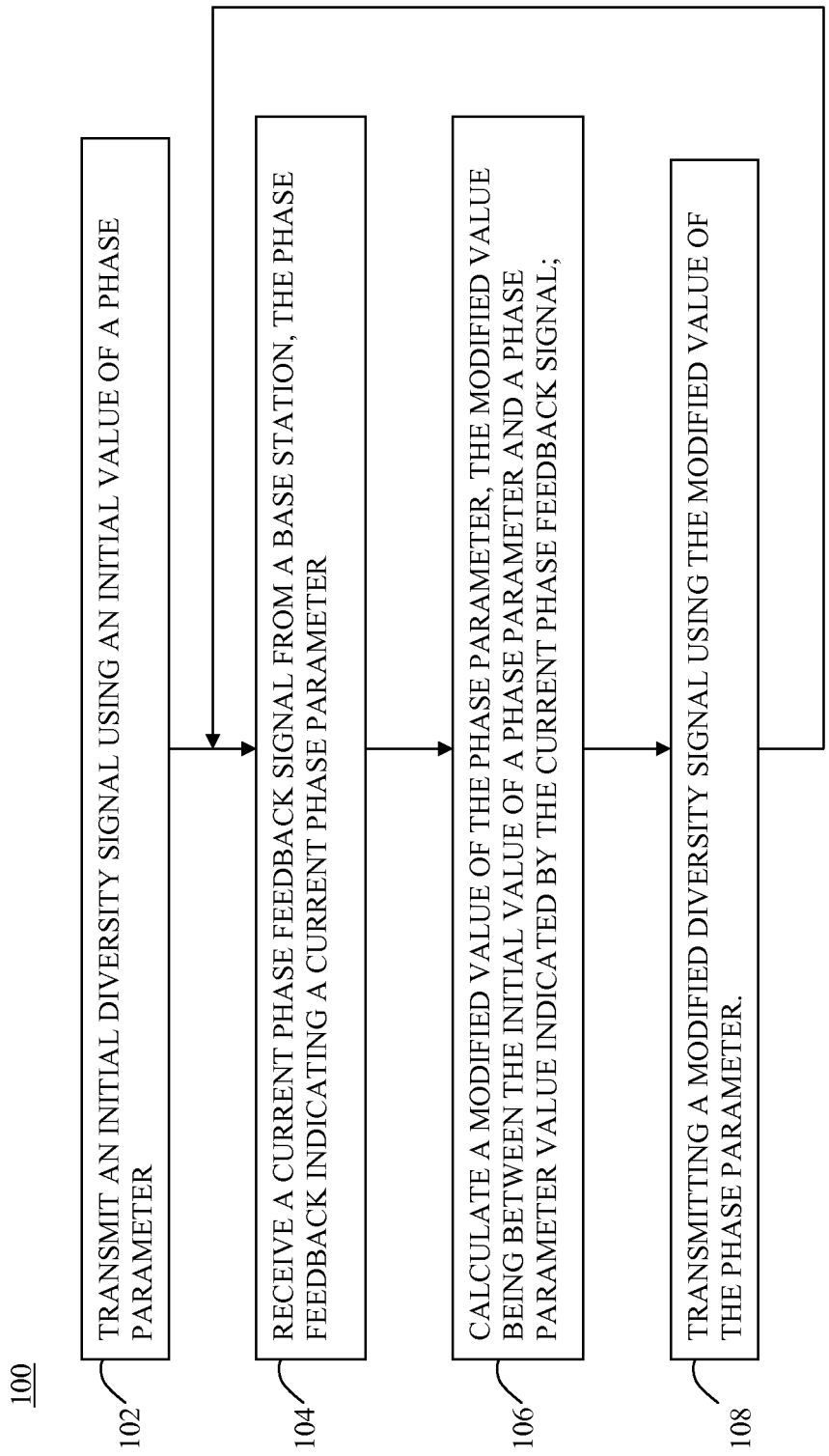
FIG. 1 is a flowchart diagram of a method of adjusting phase difference based on closed-loop phase feedback from a base station, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The present invention may be applicable in any communication network between a mobile device and a second communication device, including but not limited to a base station. Networks may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Communication devices in a network may use any suitable multiple access technology, for example, a code division multiple access (CDMA) technology. According to one embodiment, the network may operate according to a CDMA 2000 telecommunications technology that uses a single CDMA channel. As an example, a CDMA 2000 high rate data packet technology, such as the Evolution Data Optimized (EvDO) technology may be used. Other examples of multiple access technology include wide band CDMA and UMTS (Universal Mobile Telecommunications System). A corresponding high data rate application such as High Speed Packet Access (HSPA) technology may be used as well.

The network may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of a network, for example, a mobile communication device or mobile user equipment device (mobile device), may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

The communication network may include one or more mobile communication devices and one or more other communication devices that receive signals from mobile devices and give feedback, for example, base stations that communicate with a mobile device via a wireless link. A mobile communication device unit may comprise any device operable to communicate with a base station, for example, a personal digital assistant (PDA), a cellular telephone, a mobile handset, a laptop computer, or any other device suitable for communicating signals to and from a base station. A subscriber unit may support, for example, Session Initiation Protocol (SIP), Internet Protocol (IP), or any other suitable communication protocol.

A base station may provide a mobile communication device access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

According to embodiments of the invention, the mobile communication device may include two or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band. The two signals may propagate along different paths and may reach the receiving communication device or base station with different phases that constructively or destructively interfere. Two or more signals that constructively interfere may exhibit higher diversity gain, or higher relative performance than if the sum of the two signals were transmitted. Diversity gain may be an indicator of efficient signal performance.

A diversity signal may include two or more signals transmitted contemporaneously on the two or more antenna elements. Diversity signals may be transmitted using a diversity parameter. A diversity parameter may be a parameter or value by which the transmissions on any two antennas differ, for example a difference in transmission phase on the two antennas, or a ratio of transmission power on the two antennas. It will be understood that although examples are provided in the present application pertaining to phase difference between two antennas, the invention is applicable using the same principles to varying any transmit diversity parameter. Although the embodiments described in the present application are described as using two antennas, it will be recognized that the present invention is equally applicable to transmit diversity systems and devices having more than two antennas.

According to embodiments of the present invention, the mobile communication device may include a processor and a transmit/receive module that calculate and produce one or more signals for transmission over at least first and second antennas. A phase modulator may produce a phase difference between two or more signals that are transmitted on the two or more antennas.

The value of a transmit diversity parameter may be determined based on a number of feedback schemes, including "open-loop" feedback, in which the mobile device calculates the value based on signal quality feedback signals sent by the base station, which may not necessarily be dedicated to transmit diversity, or "closed-loop" feedback, in which the mobile device calculates the value based on a phase correction or modification feedback signal sent by the base station, e.g., an explicit instruction from the base station to adjust or modify the value of the transmit diversity parameter in a particular direction and/or by a particular amount.

According to embodiments of the invention, modifying a diversity signal may refer to modifying a signal feature or a diversity parameter. For example, a signal may be transmitted by the two antennas using a modified signal feature, or a different value of a transmit diversity parameter than a previous value. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. According to embodiments of the invention, modifying a signal may refer to adjusting, for example, a nominal value of a phase feedback parameter so that two signals have a different relative phase than before signal modifications. Other modifications may occur.

The quality of one or more recent uplink signals from the mobile device may depend on the changing geometry or position of the mobile device with respect to the base station and through varying propagation conditions. Accordingly, in a closed-loop feedback scheme, a base station may send to a mobile device a transmit diversity feedback signal, e.g., a phase feedback signal, instructing the mobile device to modify or set its value of the transmit diversity parameter. For example, an instruction may include a phase feedback parameter, commanding a mobile device to modify the diversity signal's relative phase difference. A base station may expressly instruct the mobile device how to modify the phase difference so as to improve reception, based on the quality of past or recent uplink signals from the mobile device. The transmit diversity feedback signal may be the desired value, or a differential value relative to the current value, and may be sent as the actual value, or as a code from a codebook. The mobile device may use the base station's instructions to determine a modified phase parameter.

In some embodiments of the invention, a mobile network communication standard may limit the number of bits that are used to send diversity feedback to the mobile device. For example, the base station's phase feedback signal may be two bits, in order not to take up excessive bandwidth from other downlink communication signals and data. The combination of bit values may correspond to a value of phase difference, e.g. '00' may refer to a phase parameter value of 0°, '01' may refer to a phase parameter value of +90°, etc. Other phase parameter values may be used. With a limited number of bits in the feedback signal, e.g., n bits, the base station may be limited to describing $2^n$ possible values of phase parameters, e.g., for n=2, four possible values of phase parameters may include 0°, +90°, 180°, or −90°. If strictly complying with the base station's instructions, the mobile device may be prevented from optimizing the transmission quality of its uplink diversity signal due to the large phase step difference between the possible phase parameters (e.g., a minimum phase step difference of 90°). According to some embodiments, the mobile device may transmit diversity signals using finer phase difference resolutions and smaller phase steps between adjacently valued phase parameters.

In some embodiments of the invention, a base station may provide closed-loop feedback to the mobile device by sending a transmit diversity feedback signal, e.g. phase feedback signal, to the mobile device. As discussed above, such a phase feedback signal may include a value of a phase parameter. Feedback information from the base station may be used to calculate a modified value of a phase parameter that is a smaller phase step towards the value of a phase parameter indicated by the base station's phase feedback signal. According to embodiments of the invention, the mobile device may use beamforming to transmit diversity signals using phase parameter values that reach the base station's phase parameter value in a graduated manner. As described below, according to embodiments of the invention, the mobile device may transmit a diversity signal with a modified value of a phase parameter that is between the phase value indicated by the base station's phase feedback signal and a phase value that the mobile device is currently using to transmit an initial diversity signal.

For example, in some embodiments of the invention, a mobile device may receive a plurality of consecutive phase feedback signals that indicate the same value of a phase parameter. As discussed previously, a base station may send phase feedback signals to a mobile device based on, for example, the changing geometry or position of the mobile device with respect to the base station. A plurality of the same consecutive phase feedback signals sent to a mobile device may imply that the mobile device is unlikely to drastically change its position relative to the base station, or that the mobile device is traveling more slowly. In such a case, the mobile device may determine to transmit diversity signals at a finer phase difference resolution, so that if the base station sends a different phase feedback signal, the mobile device may calculate a modified value of a phase parameter that is between the phase value that the mobile device is currently using and the phase value indicated by the base station's phase feedback signal. The mobile device may transmit successive diversity signals, each with phase parameters that differ at smaller phase steps than the phase steps between adjacently valued phase feedback signals. The smaller phase steps may mitigate against a base station's overcorrection in the phase value transmitted with a diversity signal. The mobile device may thus change phase parameters more gradually or at a slower rate than the rate of change of the base station's phase feedback signals.

FIG. 1 depicts a flowchart of a method 100 by a mobile device of adjusting phase difference based on closed-loop phase feedback from a base station, according to an embodiment of the invention.

At block 102, a mobile device may transmit an initial diversity signal to a base station using an initial value of a phase parameter. At block 104, the mobile device may receive a current or recent phase feedback signal from a base station. The phase feedback signal sent by the base station may be based on the quality of the mobile device's initial diversity signal, as received at the base station. The phase feedback signal may contain a value of a phase parameter, which may be calculated by the base station to increase diversity gain at the base station as expected if the mobile device transmitted a diversity signal with the desired value of the phase parameter.

At block 106, the mobile device may calculate a modified value of the phase parameter. The modified phase parameter value may be a gradual phase step toward the phase parameter indicated by the base station's phase feedback signal. The modified phase parameter may be calculated, for example, by applying a small phase step to the initial phase parameter value used by the mobile device. The modified phase parameter may have a value that is between the initial phase parameter value and the current value indicated by the current phase feedback signal received in block 102.

At block 108, the mobile device may transmit a modified diversity signal using the calculated modified value of the phase parameter.

The method may repeat blocks 104-108. Thus, for example, the modified value of the phase parameter in 108 may become the initial or first value of a phase parameter that is modified again once the method reaches step 108 in a subsequent cycle.

According to some embodiments of the invention as illustrated in FIG. 1, the mobile device's diversity signal may change gradually over time with more precision, as compared to a system where the mobile device strictly complies with the base station's phase feedback signals. The calculation of the modified phase parameter value may be calibrated based on the recent behavior of phase feedback signals. For example, if more phase feedback signals are similar than are different in a recent time period, the modified diversity signal may be calculated with smaller phase steps toward a value indicated by a phase feedback signal. Conversely or alternatively, if phase feedback signals are more likely to differ from a succeeding phase feedback signal in a time period, the modified diversity signal may be calculated with larger phase steps toward a phase parameter value.

FIG. 2A is flowchart of a method of adjusting phase difference based on comparing a current phase feedback with a prior phase feedback signal, according to an embodiment of the present invention. At block 202, a mobile device may transmit an initial diversity signal using an initial phase parameter. At block 204, the mobile device may receive, from a base station, a current phase feedback signal meant to instruct the mobile device to transmit the next diversity signal at an indicated phase difference.

At block 206, the mobile device's processor may compare the current phase feedback to a prior phase feedback signal received in a transmit cycle just before the transmit cycle of the current phase feedback signal. At block 208*a*, if the current phase feedback is the same as the prior phase feedback signal, e.g., both phase feedback signals indicate a same value of a phase parameter, the mobile device's processor may apply a phase step value to the initial value of a phase parameter in a direction towards the phase parameter of the current phase feedback signal. Applying a phase step value may include adding or subtracting a phase value. The phase step may be smaller than the difference between two adjacently valued phase feedback signals. For example, if the possible phase feedback signals from the base station differ by 90°, the phase step may predetermined to be 5°, 15°, 30°, 45°, or any other value less than 90°.

At block 208b, if the current phase feedback signal indicates a different value than the prior phase feedback signal, the modified phase parameter value may be calculated as a midpoint value between the values of the current phase feedback signal and the prior phase feedback signal. For example, if a current phase feedback signal indicated a phase difference of 90°, and the prior phase feedback signal indicated a phase difference of 0°, the modified phase parameter may have a value of 45°. The mobile device may then transmit a modified diversity signal at block 210, using the calculated modified phase parameter value. Blocks 204-210 may be repeated as more phase feedback signals are received from the base station.

Figure 2B:
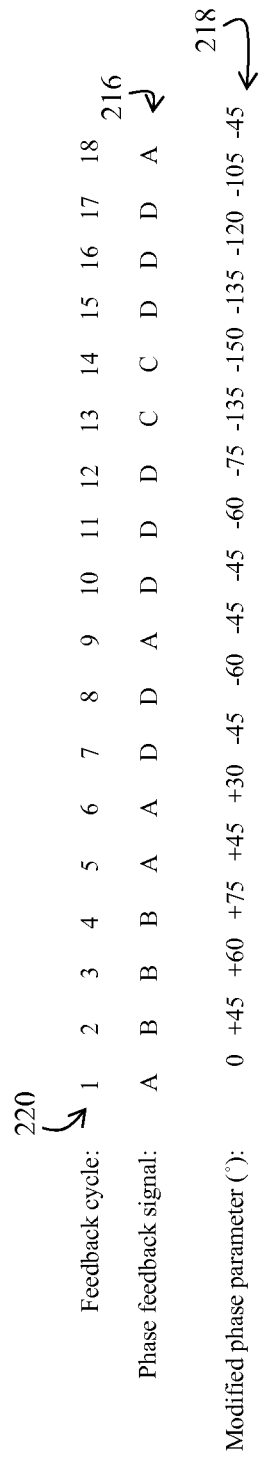
FIG. 2B a schematic depiction of a series of closed-loop phase adjustments, according to an embodiment of the invention.

FIG. 2B illustrates a series of closed-loop phase adjustments, according to an embodiment of the invention. A base station may, for example, have four possible phase parameters to transmit in a phase feedback signal: 0°, +90°, 180°, or −90°, as indicated in the legend as A, B, C, or D 212. The mobile device may use a predetermined small phase step 214 of 15°. A series of modified phase parameters 218 may be calculated based on a series of phase feedback signals 216 from the base station. Each feedback cycle 220 may include a phase feedback signal received from the base station, and a modified phase parameter value calculated by the mobile device and transmitted in a diversity signal. The calculation of the modified phase parameter value may be based on the phase feedback signals received from the base station. It will be understood that the specific values used in FIG. 2B are for illustration purposes, and that other values may be used and calculated according to embodiments of the invention. For example, a base station may have more or less than four possible phase parameters to transmit. The predetermined phase step may be a different value other than 15°, such as 5°, 10°, 20°, 22.5°, or 25°.

In feedback cycle 1, for example, the modified phase parameter may comply with the base station's instructions, e.g., the mobile device may transmit a first diversity signal with phase parameter of 0° upon receiving first phase feedback signal of 0°. In feedback cycle 2, when the second phase feedback signal of +90° is transmitted to the mobile device, it is compared with the prior phase feedback signal of 0°. Since the second, or "current" phase feedback signal is different from the first phase feedback signal, the mobile device may calculate the modified phase parameter as a midpoint value between 0° and +90°, resulting in +45°. In feedback cycle 3, the third phase feedback signal of +90° is received, the mobile device will compare it with the second, or "prior" phase feedback signal received in feedback cycle 2. Since the third and second phase feedback signal indicate the same value of a phase parameter, e.g., they both indicate +90°, the modified phase parameter may be calculated by adding the small phase step of 15° to the previous phase parameter transmitted at +45°. This results in a modified phase parameter indicating +60° for feedback cycle 3. In feedback cycle 4, the fourth phase feedback signal may again indicate the same phase parameter as the third phase feedback signal, and the small phase step may again be added to the previously calculated modified phase parameter of +60° in feedback cycle 3. This results in a modified phase parameter of +75° for feedback cycle 4. When the fifth phase feedback signal is compared to the fourth phase feedback signal in feedback cycle 5, the mobile device may determine that they indicate different values, e.g., the fifth phase feedback signal indicates 0° and the fourth phase feedback signal indicated +90°. The fifth modified phase parameter may be calculated as the midpoint between the fourth and fifth phase feedback signal, resulting in +45° for the modified phase parameter in feedback cycle 5.

With each subsequent feedback cycle, the same operations of comparing phase feedback signals and calculating modified phase parameter based on the comparison may be repeated.

According to some embodiments of the invention, the mobile device may have additional or other constraints or controls in determining whether and how to calculate a modified value of a phase parameter between the values of a current or most recent phase feedback signal and the value of an initially transmitted phase parameter. For example, the mobile device may determine to calculate a modified value of the phase parameter only if a plurality of consecutive phase feedback signals from the base station indicate the same phase value. In another example, as described above in FIGS. 2A and 2B, the calculation may depend on a comparison between the current phase feedback signal and a prior phase feedback signal. In yet another example, calculation may depend on a proportion of phase feedback changes that occur in a plurality of phase feedback signals received in a time period, e.g., 50ms, 100ms, or 1s. Additional or other controls or comparisons may be performed before the mobile device enters a phase adjustment mode or determines an appropriate method of calculation. According to some embodiments of the invention, the mobile device may also perform other operations to calculate the modified phase parameter, in addition to the operations described in FIGS. 1, 2A, and 2B. For example, the mobile device may multiply a fraction to the difference in value between a current feedback signal and a prior feedback signal, and add the result to an initially transmitted phase parameter. Other types or combinations of mathematical operations may be performed in the calculation. It will be understood that the modified value may be between the initial phase parameter value and the phase parameter indicated by a most recent phase feedback signal, and the calculation of the modified phase value may be based on the phase feedback signals from the base station or other diversity feedback received.

Figure 3:
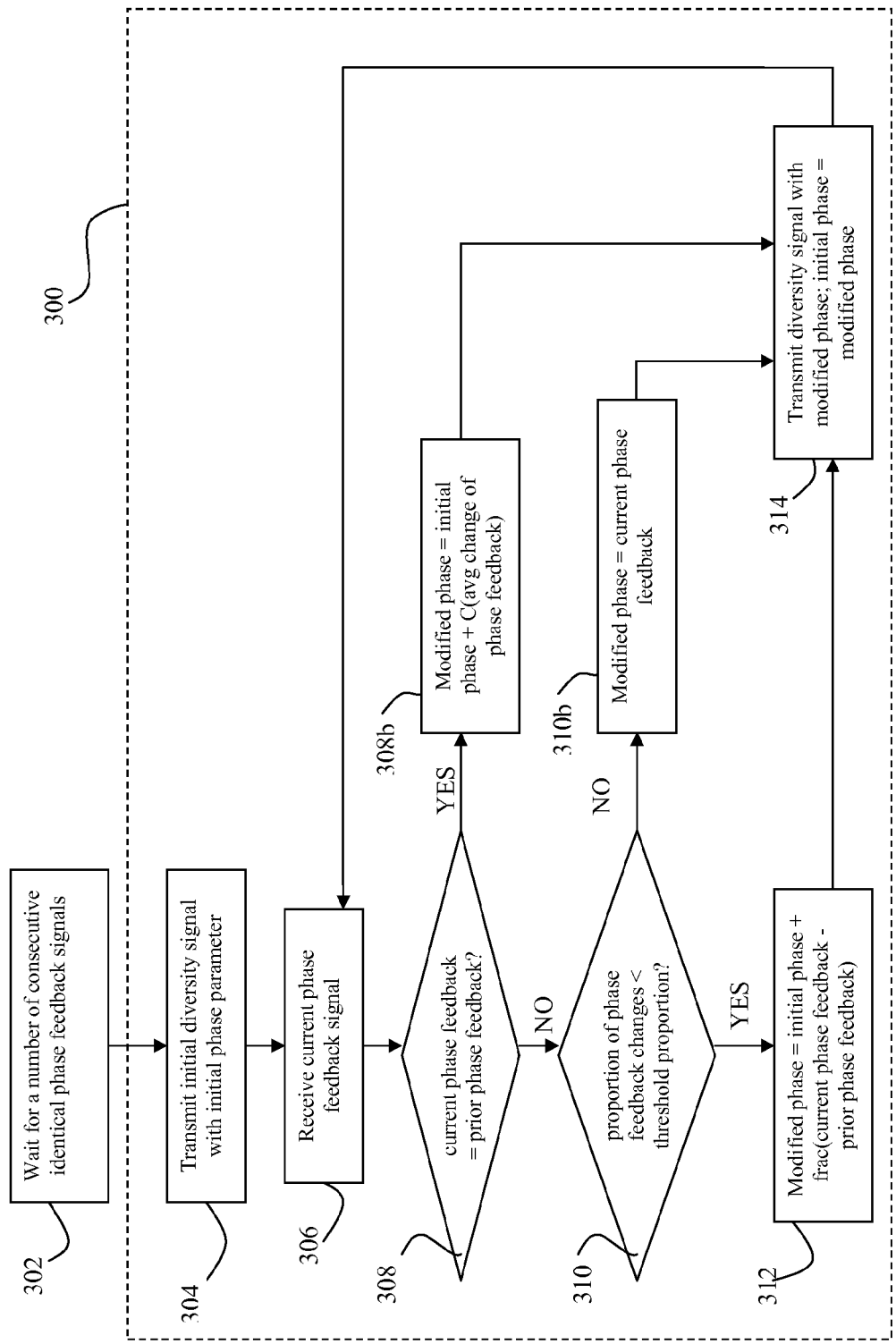
FIG. 3 is an illustration of a combination of control and calculation methods for phase adjustment, according to an embodiment of the invention.

FIG. 3 is an illustration of a combination of control and calculation methods for phase adjustment, according to an embodiment of the invention. At block 302, the mobile device may first wait for a certain number of consecutive phase feedback signal indicating the same phase parameter value, e.g., the mobile device may wait for six consecutive phase feedback signals indicating a phase parameter value of −90° or other value. Until then, the mobile device may transmit diversity signals complying with phase feedback signals received from a base station. Once a threshold number of consecutive identical phase feedback signals are received and the mobile device receives a different phase feedback signal from the previous identical signals, the mobile device may enter into a phase adjustment mode at block 300.

A mobile device may transmit an initial diversity signal with an initial value of a phase parameter at block 304, and receive a current phase feedback signal from a base station at block 306. The mobile device's processor may then enter into a series of control loops to calculate an appropriate modified phase parameter value. At block 308, the current phase feedback signal may be compared with a prior phase feedback signal. If both the current and prior phase feedback signals indicate the same phase parameter value, the mobile device's processor may calculate a modified phase parameter value by multiplying a constant to an average change in value of a plurality of phase feedback signals in a time period. The result may be added to the initial value of the phase parameter at block 308b. At block 314, the modified phase parameter may be transmitted. The method may restart at block 306 when the mobile device receives a subsequent current phase feedback signal from a base station. The modified phase parameter from the previous cycle may become the initial phase parameter transmitted with an initial diversity signal.

At block 308, if the mobile device determines that the current and prior phase feedback signal indicates a different phase parameter value, the mobile device's processor may determine a proportion of phase feedback changes among a plurality of phase feedback signals received in a time period at block 310. At block 310, the proportion may be compared with a threshold proportion, and the calculation of the modified phase parameter may be based on that comparison. Determining the proportion of phase feedback changes that occur in a time period may involve comparing each phase feedback signal in the time period to a succeeding phase feedback signal, determining the number of phase feedback signals that are different from a succeeding phase feedback signal, and then dividing by the number of phase feedback signals in said plurality of phase feedback signals. The proportion may represent a probability that the phase feedback signal from a base station may change in future transmit cycles.

At block 310, the determined proportion may be compared with a threshold proportion, and if the proportion is less than a threshold proportion, e.g., the likelihood that phase feedback signals will change dramatically is lower, then the mobile device's processor may calculate a modified micro phase parameter value by multiplying a fraction to the difference in value between the current feedback signal and a prior feedback signal. The resulting phase step may be added to the initial value of the phase parameter towards a same direction indicated by the phase feedback signal so that the modified phase parameter value is between the value of the received phase feedback signal and the value of the initial phase parameter. At block 314, the calculated modified phase parameter may be transmitted with a modified diversity signal. If the determined proportion is greater than a threshold proportion at block 310, the modified phase parameter may comply with the current phase feedback signal at block 310b.

In some embodiments of the invention, other control blocks may be used that are different from the control blocks illustrated in FIG. 3, or the control blocks of FIG. 3 may be in a different order. For example, block 308 and 310 may be in a different order, or another control block may be between them, leading to another calculation block determining a modified value of a phase parameter.

In some embodiments of the invention, the mobile device may continue to monitor and compare the phase feedback signals received from the base station. For example, after each transmission of a modified diversity signal with a modified phase parameter, or after a period of time transmitting using the modified phase parameter, blocks 304-312 may be repeated. The mobile device may receive further phase feedback signals or other diversity feedback from the base station. Prior to calculating a further modified diversity signal, the mobile device's processor may again compare phase values of successive phase feedback signals received from the base stations, for example.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of transmitting a diversity signal by a mobile wireless communication device, comprising:
    transmitting an initial diversity signal using an initial value of a phase parameter;
    receiving a current phase feedback signal from a base station indicating a current value of the phase parameter;
    determining to calculate and then calculating a modified value of the phase parameter, said modified value being between the initial value of the phase parameter and the current value of the phase parameter; and
    transmitting a modified diversity signal using said modified value of the phase parameter,
    wherein calculating the modified value of the phase parameter comprises:
        comparing the current phase feedback signal to a prior phase feedback signal received from the base station,
        if the current phase feedback signal is the same as the prior phase feedback signal, then adding a phase step value to the initial value of the phase parameter in a direction towards the current value of the phase parameter, and
        if the current phase feedback signal is different from the prior phase feedback signal, then calculating the modified value of the phase parameter as a midpoint value between the current value of the phase parameter and a value of the prior phase parameter.

2. The method of claim 1, wherein determining to calculate a modified value of the phase parameter occurs when a plurality of consecutive phase feedback signals received from the base station are the same.

3. The method of claim 1, further comprising said steps of:
    determining a proportion of phase feedback changes among a plurality of phase feedback signals received in a time period; and
    determining to calculate the modified value of the phase parameter based on the proportion.

4. The method of claim 3, wherein the step of determining the proportion of the phase feedback changes among the plurality of the phase feedback signals received in the time period comprises:
    comparing each phase feedback signal in the plurality of the phase feedback signals to a succeeding one of the phase feedback signals,
    determining the number of the phase signals; and
    dividing by a number of the phase feedback signals in the plurality of the phase feedback signals.

5. The method of claim 3, wherein determining to calculate the modified value of the phase parameter comprises:
    comparing the proportion to a threshold proportion; and
    when the proportion is less than the threshold proportion, then calculating the modified value of the phase parameter.

6. The method of claim 1, wherein calculating the modified value of the phase parameter comprises:
    multiplying a fraction by the difference between the current value of the phase parameter indicated by the current phase feedback signal and the value of the prior phase parameter indicated by the prior phase feedback signal, resulting in the phase step; and
    adding the phase step to the initial value of the phase parameter towards a same direction indicated by the current phase feedback signal.

7. The method of claim 1, wherein calculating the modified value of the phase parameter comprises:
    multiplying a constant by an average change in the current value of a plurality of phase feedback signals in a time period, resulting in the phase step; and
    adding the phase step to the initial value of the phase parameter.

8. A mobile communications device, comprising:
a phase modulator to produce an initial phase difference between two signals transmitted on first and second antennas, based on an initial value of a phase parameter;
a processor to:
- receive a current phase feedback signal from a base station, the current phase feedback indicating a current value of the phase parameter; and
- calculate a modified value of the phase parameter by comparing the current phase feedback signal to a prior phase feedback signal received from the base station,
- if the current phase feedback signal is the same as the prior phase feedback signal, then adding a phase step value to the initial value of the phase parameter in a direction towards the current value of the phase parameter, and
- if the current phase feedback signal is different from the prior phase feedback signal, then calculating the modified value of the phase parameter as a midpoint value between the current value of the phase parameter and a value of the prior phase parameter; and
- wherein the phase modulator further produces a modified phase difference between two signals transmitted on the first and second antennas, based on the modified value of the phase parameter.

9. The mobile communications device of claim 8, wherein when a plurality of consecutive phase feedback signals received from the base station are the same, the modified value of the phase parameter is then calculated.

10. A mobile transmit diversity system, comprising:
a mobile communications device in uplink communication with a base station; and wherein:
- the mobile communications device transmits an initial diversity signal using an initial value of a phase parameter;
- the mobile communications device receives transmit diversity feedback from the base station;
- the mobile communications device calculates a modified value of a phase parameter that is between the value of the initial phase parameter and a current value of the phase parameter indicated by a current phase feedback signal; and
- the mobile communications device transmits a modified diversity signal using the modified value of the phase parameter,
wherein the mobile communications device calculates the modified value of the phase parameter by comparing the current phase feedback signal to a prior phase feedback signal received from the base station,
when the current phase feedback signal is the same as the prior phase feedback signal, a phase step value is added to the initial value of the phase parameter in a direction towards the phase parameter of the current phase feedback signal, and
when the current phase feedback signal is different from the prior phase feedback signal, the modified value of the phase parameter is calculated as a midpoint value between the current value of the phase parameter and a value of the prior phase parameter.

11. The mobile transmit diversity system of claim 10, wherein the mobile communications device calculates the modified phase parameter once a plurality of phase feedback signals from the base station are the same.

* * * * *